United States Patent Office 3,707,449
Patented Dec. 26, 1972

3,707,449
PROCESS FOR THE PRODUCTION OF PURE AQUEOUS POTASSIUM AS SODIUM HEXACYANOFERRATE (III) SOLUTION
Helmut Reinhardt, Weiss, and Karl Trebinger and Gottfried Kallrath, Wesseling, Germany, assignors to Deutsche Gold- und Silber-Scheideanstalt vormals Roessler, Frankfurt am Main, Germany
No Drawing. Continuation-in-part of application Ser. No. 129,173, Mar. 29, 1971. This application May 17, 1971, Ser. No. 144,289
Claims priority, application Germany, Apr. 9, 1970, P 20 16 848.3; May 3, 1971, P 21 21 647.7
Int. Cl. C01c 3/12
U.S. Cl. 204—91     7 Claims

ABSTRACT OF THE DISCLOSURE

Pure aqueous solution of potassium hexacyanoferrate (III), sodium hexacyanoferrate (III) and sodium potassium hexacyanoferrate (III) are prepared by oxidation of the corresponding hexacyanoferrate (II) solutions with acids containing the group $[Fe(CN)_6]$ and an oxidizing agent having an oxidation potential greater than $+0.46$ volt.

---

The present application is a continuation-in-part of application Ser. No. 129,173, filed Mar. 29, 1971.

It is known to produce potassium hexacyanoferrate (III) solutions by the electrolytic oxidation of potassium hexacyanoferrate (II) solutions or by oxidation with known oxidizing agents such as chlorine, chloride of lime (bleaching powder), lead dioxide, bismuth pentoxide, calcium plumbate or persulfate (Ullmann, Encyclopedia der Technischen Chemie, vol. 5, 1954, page 659). It is also known to produce potassium hexacyanoferrate (III) by oxidation with air under pressure (Schroter German Pat. 502,883).

Common to all of these processes is the fact that a part of the added potassium ions are lost as by-products. Besides the reaction solution becomes alkaline if the potassium hydroxide formed is not neutralized by the addition of foreign ion containing acids. Only in this way is the reverse reaction to form potassium hexacyanoferrate (II) avoided.

It has now been found that pure aqueous potassium hexacyanoferrate (III) solutions can be produced in neutral medium with use of the entire amount of potassium ion present if aqueous solutions of potassium hexacyanoferrate (II) are reacted with an oxidizing agent whose oxidation potential is greater than $+0.46$ volt in the presence of an acid containing the group $[Fe(CN)_6]$ i.e. $H_4[Fe(CN)_6]$ or $H_3[Fe(CN)_6]$.

In place of potassium hexacyanoferrate (III) there can be produced in the same way with equally good yields sodium hexacyanoferrate (III) and sodium potassium hexacyanoferrate (III), Na $K_2[Fe(CN)_6]$ by employing as the starting material aqueous solutions of sodium hexacyanoferrate (II) and a mixture of sodium hexacyanoferrate (II) and potassium hexacyanoferrate (II).

As oxidizing agents there can be used water soluble permanganates, e.g., sodium permanganate, potassium permanganates and ammonium permanganate, water soluble manganates, e.g. potassium manganate and sodium mtnganate, water soluble dichromates, e.g. ammonium dichromate, potassium dichromate and sodium dichromate, water soluble cerium (IV) salts, e.g. ceric sulfate, water soluble bromates, e.g. sodium bromate and potassium bromate, as well as lead dioxide, nitrosyl gases, oxygen e.g. as pure oxygen or as air and hydrogen peroxide. Electrolytic oxidation is also useful.

Especially suitable as oxidizing agents in which after the reaction the only by-product present is water are oxygen and hydrogen peroxide. Likewise the electrolytic oxidation is preferred. In the latter case the only by-product in addition to water is the acid employed. Most especially suitable is hydrogen peroxide.

The reactants, i.e. the potassium hexacyanoferrate (II) (or sodium hexacyanoferrate (II) or mixtures of sodium and potassium hexacyanoferrate (II)), the oxygen providing substance and the acid are added in equivalent amounts. This is also true for the anodic oxidation.

Hydrogen peroxide can be added as an aqueous solution of known concentration, e.g. 3 to 70 weight percent solution, preferably as a 10 to 50% solution.

The potassium hexacyanoferrate II (or sodium hexacyanoferrate (II) or mixture of sodium hexacyanoferrate (II) and potassium hexacyanoferrate (II)) generally is present as a 10–45 weight percent aqueous solution.

As acids which contain a $[Fe(CN)_6]$ group there can be employed hydroferrocyanic acid, $H_4[Fe(CN)_6]$, and hydroferricyanic acid, $H_3[Fe(CN)_6]$. They can be prepared in known manner by reaction of their barium salts with sulfuric acid or their alkali salts, e.g. sodium or potassium salts with mineral acids such as hydrochloric acid, sulfuric acid, hydrobromic acid, phosphoric acid, etc. According to a further proposal according to the invention an especially pure aqueous hydroferrocyanic acid or hydroferricyanic acid is produced by reaction of an aqueous solution of the corresponding alkali metal salts, e.g. the sodium and potassium salts, the potasium salt being especially preferred, on acidic exchange resins. The thus obtained hydroferrocyanic acid or hydroferricyanic acid is salt free and free of foreign acids. As ion exchangers there can be used strongly acid cation exchangers, particularly sulfonated cation exchange resins such as those set forth in D'Alelio Pat. 2,366,007 e.g. insoluble sulfonated styrene resins such as sulfonated styrene-divinyl benzene resin (e.g. Dowex 50 and Amberlite IR–120), as well as sulfonated phenol-formaldehyde resins.

If a solution of potassium hexacyanoferrate (II) is used for the continuous production of potassium hexacyanoferrate (III) (or a solution of sodium hexacyanoferrate (II) for the production of sodium hexacyanoferrate (III)) which is obtained by the reaction of its potassium salt (or sodium salt) with an ion exchange resin there occurs no loss of potassium ion (or sodium ion) during the entire cyclic process including the obtaining of the potassium hexacyanoferrate (II) (or sodium hexacyanoferrate (II)) charged, since this is recovered from the ion exchanger by acid rinsing and is reduced to the step of producing the potassium hexacyanoferrate (II) (or sodium hexacyanoferrate (II)).

The process of the invention is carried out in known manner in mixing vessels in which there are provided propellers, turbines or disc stirrers for adequate intermixing, as well as in rotary mixers. The temperature of the reaction is not critical, e.g., it can be 40 to 100° C.

The process is also normally carried out at atmospheric pressure and there is no need to use pressure equipment.

If oxidizing agents are added which provide no by-products besides water, it is possible to recover potassium hexacyanoferrate (III) (or sodium hexacyanoferrate (III) (or sodium potassium hexacyanoferrate III (as a solid from the resulting pure solution in simple manner by direct crystallization or spray drying. In the other cases it is necessary to work up the solutions by customary methods.

The technical advantages of the process of the invention include the fact that the oxidation of the potassium hexacyanoferrate (II) (or sodium hexacyanoferrate (II)) occurs in neutral or acid medium, e.g., pH of 1 to 7 and thereby is avoided a back reaction through hydroxyl ions formed in the reaction solution, i.e., the hexacyanoferric acid neutralizes the hydroxide formed. Furthermore by the presence of an acid of the same ion acid, the potassium ion (sodium ion) added is reacted quantitatively in the end product and unlike previous procedures is not lost in part as by-product. Besides no foreign ions are brought into the reaction mixture through the acid which can later cause problems in the working up.

Unless otherwise indicated all parts and percentages are by weight.

The invention will be explained further in connection with the examples.

EXAMPLE 1

2.3 m.³ (cubic meters) of an aqueous potassium hexacyanoferrate (II) solution containing 210 grams of $K_4[Fe(CN)_6]\cdot 3H_2O$ per liter were mixed in a container provided with a stirrer with 0.76 m.³ of an aqueous solution of $H_4[Fe(CN)_6]$ containing 110 grams of $$H_4[Fe(CN)_6]$$

per liter. The mixture was warmed to 60° C. and inside 10 minutes was oxidized with 258 liters of a 10% aqueous hydrogen peroxide solution. During the oxidation the temperature rose to 76° C.

There was formed 3.3 m.³ of an aqueous potassium hexacyanoferrate (III) solution having a content of about 150 grams of $K_3[Fe(CN)_6]$ per liter.

EXAMPLE 2

837 cm.³ (cubic centimeters) of an aqueous solution of $H_4[Fe(CN)_6]$ having a hexacyanoferrate (II) content of 0.6 mole per liter was placed in a 4 liter flask and treated with 634 grams of crystalline $K_4[Fe(CN)_6]\cdot 3H_2O$. This mixture was heated to 60° C. a clear solution was obtained. Inside 10 minutes there were introduced 111 grams of perhydrol (an aqueous solution of $H_2O_2$ containing about 32 weight percent of hydrogen peroxide) diluted with water to 500 cm.³. The reaction temperature rose to about 80° C.

There was obtained a $K_3[Fe(CN)_6]$ solution with a content of 345 grams of $K_3[Fe(CN)_6]$ per liter. The yield was quantitative.

EXAMPLE 3

Aqueous solutions of $K_4[Fe(CN)_6]\cdot 3H_2O$ and $$H_4[Fe(CN)_6]$$

were mixed in the proportions set forth in Example 1. This mixture was simultaneously introduced into a reactor with the necessary amount of an aqueous $H_2O_2$ solution (having an $H_2O_2$ concentration of 10%). The temperature in the reactor was held at 60° C. The residence time of the reaction mixture in the reactor on the average was 10 minutes. By continuous removal of the $K_3[Fe(CN)_6]$ solution prepared the reaction volume was maintained constant.

EXAMPLE 4

A customary cation exchange resin (sulfonated styrene-divinyl benzene resin) was converted to the hydrogen form in known manner and subsequently washed free of electrolyte.

565 cm.³ of the hydrogen form of the ion exchange resin were charged with a solution of $K_4[Fe(CN)_6]$ solution having a content of $K_4[Fe(CN)_6]\cdot 3H_2O$ of 212 grams per liter with a speed of passage of 1 liter of solution per hour.

There was obtained an aqueous solution of $$H_4[Fe(CN)_6]$$

with a content of 105 grams of $H_4[Fe(CN)_6]$ per liter of solution.

EXAMPLE 5

One liter of a hot (80° C.) aqueous sodium hexacyanoferrate (II) solution, containing 395 grams of $$Na_4[Fe(CN)_6]\cdot 10H_2O$$

was mixed in a container, provided with a stirrer, with 0.51 liter of an aqueous solution of $H_4[Fe(CN)_6]$, containing 116 grams per liter. Inside 10 minutes there were introduced 65 grams of an aqueous solution of $H_2O_2$ (containing 30 weight percent of hydrogen peroxide). This mixture was heated to 60° C. During the oxidation the temperature rose to 84° C. There was formed 1.5 liter of an aqueous sodium hexacyanoferrate (II) solution, having a content of about 206 grams of $Na_3(Fe(CN)_6]$ per liter.

EXAMPLE 6

One liter of an aqueous solution, containing 84 grams of sodium hexacyanoferrate (II) ($Na_4[Fe(CN)_6]\cdot 10H_2O$ and 147 g. of $K_4[Fe(CN)_6]\cdot 3H_2O$, was mixed with 324 cm.³ of an aqueous solution of $H_4[Fe(CN)_6]$ containing 116 g. of the acid per liter and 42 g. of a 32 weight percent of aqueous hydrogen peroxide were mixed and heated to 60° C. The reaction temperature rose to about 73° C. during the oxidation. There was obtained 1.4 liter of a $K_2Na[Fe(CN)_6]$ solution with a content of 155 g. of $K_2Na[Fe(CN)_6]$ per liter. The yield was quantitative.

The solutions of sodium and potassium hexacyanoferrate (III) prepared according to the present invention can be employed as starting materials to prepare other complex cyanides in known manner.

What is claimed is:

1. In a process for the production of pure aqueous alkali metal hexacyanoferrate (II) solutions selected from the group consisting of potassium hexacyanoferrate (III), sodium hexacyanoferrate (III) and sodium potassium hexacyanoferrate (III) by oxidation of the corresponding alkali metal hexacyanoferrate (II) solution the improvement comprising carrying out the oxidation with an oxidizing agent having an oxidation potential greater than +0.46 volt with an acid containing the [Fe(CN)₆] group selected from the group consisting of $H_4[Fe(CN)_6]$ and $H_3[Fe(CN)_6]$.

2. A process according to claim 1 wherein the oxidation is carried out with an oxidizing agent selected from the group consisting of oxygen, air and hydrogen peroxide.

3. A process according to laim 2 wherein the oxidizing agent is aqueous hydrogen peroxide of 10 to 50% concentration.

4. A process according to claim 1 wherein the oxidation is carried out electrolytically.

5. A process according to claim 1 wherein the alkali metal hexacyanoferrate (III) and (II) are potassium hexacyanoferrate (III) and (II).

6. In a process for the production of pure aqueous aqueous alkali metal hexacyanoferrate (III) solutions selected from the group consisting of potassium hexacyanoferrate (III), sodium hexacyanoferrate (III) and sodium potassium hexacyanoferrate (III) by oxidation of the corresponding alkali metal hexacyanoferrate (II) solution electrolytically or with hydrogen peroxide, oxygen or air the improvement comprising neutralizing the hydroxide formed with $H_4[Fe(CN)_6]$ or $H_3[Fe(CN)_6]$.

7. A process according to claim 6 wherein the alkali metal hexacyanoferrate (III) and (II) are potassium hexacyanoferrate (III) and (II).

References Cited
UNITED STATES PATENTS

| | | | |
|---|---|---|---|
| 1,589,041 | 6/1926 | Barsky | 23—77 |
| 1,872,929 | 8/1932 | Glnud et al. | 23—77 |
| 2,261,672 | 11/1941 | Barnes et al. | 23—77 |

FOREIGN PATENTS

| | | | |
|---|---|---|---|
| 314,956 | 2/1930 | Great Britain | 204—91 |
| 497,584 | 12/1919 | France. | |

F. C. EDMUNDSON, Primary Examiner

U.S. Cl. X.R.

23—77